(12) United States Patent
Wenzel

(10) Patent No.: US 10,422,538 B2
(45) Date of Patent: Sep. 24, 2019

(54) SYSTEM AND DEVICE FOR HEATING, COOLING, VENTILATING AND ILLUMINATING AN INTERIOR SPACE

(71) Applicant: Viessmann Werke GmbH & Co. KG, Allendorf (DE)

(72) Inventor: Bernd Wenzel, Biebertal (DE)

(73) Assignee: Viessmann Werke GmbH & Co. KG, Allendorf (DE)

( * ) Notice: Subject to any disclaimer, the term of this patent is extended or adjusted under 35 U.S.C. 154(b) by 0 days.

(21) Appl. No.: 16/062,624

(22) PCT Filed: Dec. 16, 2016

(86) PCT No.: PCT/EP2016/081597
§ 371 (c)(1),
(2) Date: Jun. 14, 2018

(87) PCT Pub. No.: WO2017/103220
PCT Pub. Date: Jun. 22, 2017

(65) Prior Publication Data
US 2018/0372335 A1 Dec. 27, 2018

(30) Foreign Application Priority Data
Dec. 17, 2015 (DE) .................. 10 2015 225 815

(51) Int. Cl.
*F24F 13/078* (2006.01)
*F24D 5/02* (2006.01)
(Continued)

(52) U.S. Cl.
CPC .................. *F24D 5/02* (2013.01); *F24F 3/00* (2013.01); *F24F 3/056* (2013.01); *F24F 5/0089* (2013.01);
(Continued)

(58) Field of Classification Search
CPC ........ F24F 3/056; F24F 13/078; F24F 2221/02
(Continued)

(56) References Cited

U.S. PATENT DOCUMENTS 5,151,063 A * 9/1992 Tanaka ...................... F24F 7/06
454/258
2010/0050662 A1 * 3/2010 Hannam .............. A47B 83/001
62/56
(Continued)

FOREIGN PATENT DOCUMENTS

CN 2713355 Y 7/2005
DE 10336593 A1 3/2005
(Continued)

OTHER PUBLICATIONS

International Search Report dated Jun. 19, 2017 for PCT App. Ser. No. PCT/EP2016/081597.

*Primary Examiner* — Christopher M Raabe
(74) *Attorney, Agent, or Firm* — Henricks Slavin LLP

(57) ABSTRACT

The present invention relates to a system for heating and/or cooling and/or ventilating and/or illuminating a room, comprising a plurality of air-conditioning modules having a flat surface which faces the room and which is designed to dissipate heat and/or cold and/or fresh air to the room; at least one distribution module which is designed to provide the plurality of air-conditioning modules with a fluid carrier medium for heat and/or cold and/or fresh air; and a control device for controlling a quantity of heat and/or cold and/or fresh air; wherein the contours of the plurality of air-conditioning modules and the at least one distribution module are designed in such a way that the plurality of air-conditioning modules and the at least one distribution module form, by virtue of their assembly, a substantially flat and continuous surface.

14 Claims, 8 Drawing Sheets

(51) Int. Cl.
  *F24F 3/00*      (2006.01)
  *F24F 3/056*     (2006.01)
  *F24F 5/00*      (2006.01)
  *G02B 6/00*      (2006.01)

(52) U.S. Cl.
  CPC .......... *F24F 5/0092* (2013.01); *F24F 13/078* (2013.01); *G02B 6/00* (2013.01); *F24F 2221/02* (2013.01); *F24F 2221/36* (2013.01)

(58) Field of Classification Search
  USPC .......................................................... 362/96
  See application file for complete search history.

(56) References Cited

U.S. PATENT DOCUMENTS

| | | | |
|---|---|---|---|
| 2010/0136897 A1* | 6/2010 | Lee ........................ | F24F 13/078 454/293 |
| 2011/0251725 A1* | 10/2011 | Chan .................. | H05B 37/0227 700/277 |
| 2014/0185305 A1* | 7/2014 | Takahashi ............... | F21V 29/02 362/373 |
| 2014/0355248 A1 | 12/2014 | Cursetjee et al. | |

FOREIGN PATENT DOCUMENTS

| | | |
|---|---|---|
| DE | 202008003864 U1 | 9/2009 |
| DE | 202010006457 U1 | 9/2010 |
| EP | 2103881 A1 | 9/2009 |
| EP | 2412521 A1 | 2/2012 |
| WO | WO 2007048194 A1 | 5/2007 |
| WO | WO 2012126524 A1 | 9/2012 |
| WO | WO 2014097805 A1 | 6/2014 |
| WO | WO 2015107714 A1 | 7/2015 |

* cited by examiner

SYSTEM AND DEVICE FOR HEATING, COOLING, VENTILATING AND ILLUMINATING AN INTERIOR SPACE

The present invention relates to a system for heating and/or cooling and/or ventilating and/or illuminating a room. The invention also relates to an air-conditioning module for heating and/or cooling and/or ventilating and/or illuminating a room.

Utility model document DE 202010006457 U1 discloses a radiator with a radiating element, in which a heating liquid circulates, and a cover which is connected to the radiating element and comprises a lighting arrangement with at least one light source. The cover can comprise a molded plate made of transparent material, e.g. PMMA.

European patent application EP 2103881 A2 discloses an air-conditioning system for rooms, which consists of a plurality of cassettes for cassette walls or ceilings. Each coffer has an air-conditioning module having an air distributor and a heat exchanger through which a fluid flows, such that during the operation of the air-conditioning module heat is exchanged between the fluid flowing through the heat exchanger and the air flowing through the air distributor. A control device controls the supply of air and fluid.

The object of the present invention is to provide a system for heating and/or cooling and/or ventilating and/or illuminating a room, said system being improved with respect to the prior art. In particular, it is intended to provide a system that consists of individual standardized modules, the arrangement of which on a wall and/or a ceiling and/or a floor of a room is particularly flexible and can subsequently be changed.

This object is achieved by a system for heating and/or cooling and/or ventilating and/or illuminating a room according to the preamble of claim 1. According to the invention, a plurality of air-conditioning modules and a distribution module are arranged on at least one wall of a room in such a way that the modules form a substantially flat and continuous surface above the and parallel to the wall.

The solution to the problem is also achieved by an air-conditioning module for heating and/or cooling and/or ventilating and/or illuminating a room according to the preamble of claim 11. According to the invention, the surface of the air-conditioning module has a plurality of scattering centers for scattering light, wherein the light is emitted by lighting means which are arranged in the edge areas of the surface or in the center of the surface.

The air-conditioning modules each have a flat surface which faces the room and via which a heat transfer with the room air can take place, such that heat and/or cold can be released to the room. The heat can also be transferred by means of radiation.

The system according to the invention can subsequently be built up in front of a wall, without infrastructure elements, such as hydraulic lines or ventilation lines, having to be available in the wall or having to be subsequently installed. The system can be built up parallel to and in front of a surface of a wall, a ceiling or a floor. Here, the surfaces of the individual modules form a substantially continuous surface which not only ensures the heat exchange with the indoor air of the room but can also be visually appealing and decorative.

Even if the present description only mentions "a wall" or "the wall" of a room, it is understood that the respective statement also applies to applications on a ceiling or on a floor of a room.

Since the air-conditioning modules are built up in front of a wall and are not installed in a wall, they can also be installed afterwards and without great construction effort in old buildings. In addition, it is possible to subsequently change or expand the arrangement of the air-conditioning modules. The air-conditioning modules can preferably be attached detachably on the wall in order that the arrangement of the air-conditioning modules can be changed.

The inventive system for heating and/or cooling and/or ventilating and/or illuminating a room comprises a plurality of air-conditioning modules which can be arranged on a wall of the room. The air-conditioning modules can have a standardized size, so that they can easily be combined to cover part, in particular a large part of the wall by means of these modules. Alternatively or additionally, air-conditioning modules can also be arranged on the floor and/or on the ceiling of the room.

The contour of the air-conditioning modules is designed in such a way that a substantially closed surface can be formed by the assembly of a plurality of air-conditioning modules. For this purpose, e.g. a rectangular, triangular or hexagonal shape or also a rhomboidal shape is suitable. A combination of different geometric forms is also possible. For the production and on account of the fact that most interior spaces of buildings have rectangular walls, floors and ceilings, it is useful to select a standardized rectangular shape for the air-conditioning modules.

The system according to the invention has at least one distribution module that is designed to provide the plurality of the air-conditioning modules with a fluid carrier medium for heat and/or cold. In addition, at least one distribution module can be designed to provide at least one air-conditioning module with fresh air. For this purpose, hydraulic lines for the fluid carrier medium can be arranged in the distribution modules, said lines serving as supply pipes and as return pipes of the air-conditioning modules. The distribution modules thus comprise the infrastructure elements, which are usually laid in such a way that they are concealed in walls, ceilings and/or floors.

The distribution modules allow the build-up of the system according to the invention in such a way that a length of a supply pipe or a length of a return pipe between each of the plurality of air-conditioning modules and an energy supplier are substantially equal such that a flow resistance of the fluid carrier medium and/or the fresh air and/or waste air for each air-conditioning module is substantially the same.

In the case of conventional heating, air-conditioning and/or ventilation systems, it is possible that a carrier medium has to overcome widely differing flow resistances on its way from the heating boiler to the individual radiators, as a result of which the volume flow through the various radiators can vary greatly. This can cause the problem that individual radiators cannot be supplied sufficiently with heat.

In order to compensate for the flow resistances in a conventional heating system, complex calculations and/or measurements can be necessary. In general, the planning effort is very great if an undersupply to individual radiators shall be avoided.

The complete supply infrastructure can be integrated into the distribution modules according to the invention. A vertical arrangement of the distribution modules on the wall serves to achieve that the flow resistance for each air-conditioning module is within a tolerable range without complex planning and/or calculation being necessary. In such an arrangement, a distribution module can supply a plurality of air-conditioning modules which are arranged on both sides of the distribution module on the wall with the fluid carrier medium, fresh air and/or electric current and/or provide corresponding return pipes.

The supply and return pipes in the distribution modules belong to the so called primary circuit. The pipes in the air-conditioning modules belong to the so called secondary circuit. The distribution modules are built up in such a way that they provide the pipes of the primary circuit in a length as uniform as possible and thus with a uniform flow resistance. The hydraulic lines of the secondary circuit can also have a uniform flow resistance due to the use of the air-conditioning modules.

The fluid carrier medium can be a liquid or a gas which preferably has a high thermal capacity. Examples of a liquid carrier medium are water which on account of its high specific thermal capacity and good availability is particularly well suitable, salt-water solutions, alcohol-water solutions or oils as well as, in particular applications, also molten salts or liquid metals. The carrier medium can also be a gas or gas mixture (e.g. air). In particular, preheated or cooled air for ventilating and heating or cooling the room could be used.

The surface of the air-conditioning modules preferably consists of a material, the heat conduction coefficient of which is as high as possible, such that an optimum heat exchange with the air of the room can take place. For example, the surface can consist of a metal, a metal alloy, e.g. aluminum, an aluminum alloy, steel, stainless steel, brass or copper. Apart from the good thermal conductivity, metals are also very easy to mold. A surface which is as flat as possible can thus be produced by using known manufacturing techniques. The surface is preferably made from a single piece of metal sheet. A further advantage of a metal surface is that openings for a ventilation can be introduced in a simple way. Metal sheets are also used in many ways in conventional radiators and have multiple advantages.

The surface can have a plurality of openings, e.g. a plurality of small holes to discharge fresh air to the room for ventilating the room. Alternatively or additionally, the openings can also serve to remove air from the room, such that the air-conditioning modules can also function as an outlet. The openings can correspondingly be air inlets and/or air outlets. The air-conditioning modules can thus ensure an active air exchange in a room, wherein the temperature of the room air can remain constant. Furthermore, the air-conditioning modules can be designed to provide an air circulation function, such that a heat exchange between room air and the heating and/or cooling circuits can be improved without an active air exchange having to take place.

The air-conditioning modules have hydraulic heating circuits and/or cooling circuits and/or ventilation channels, wherein the ventilation channels are in flow communication with the plurality of openings. The heating circuits and/or cooling circuits are in thermal contact with the air-conditioning module surface facing the room, such that a heat transfer can take place between the carrier medium and the surface. The heating circuits and/or cooling circuits can be arranged e.g. in a meandering pattern along the surface. Here, a particularly good heat transfer between the carrier medium and the surface of the air-conditioning module can be achieved.

The system comprises a control device which is designed to control a supplied quantity of heat and/or cold and/or fresh air and/or exhaust air from and/or to the air-conditioning modules. The quantity can be controlled e.g. via the control of a flow. A flow refers hereinafter generally to a liquid, air or gas flow and/or electric current. In particular, the control device can be remote-controllable. The control device can be designed to transmit control commands to the distribution modules in order to control the system.

The control device allows a coordinated control of the air-conditioning modules via the distribution modules. The secondary circuits of the system can preferably be controlled automatically via the control device and in this way be operated in an optimum state. As a result, the system can be operated in a particularly efficient fashion. A combination of the control device with modern communication technology can also effect a remote control of the system, which can be conducted e.g. via the internet, in particular also by using a control application on a mobile terminal.

The distribution modules can have hydraulic couplers via which a detachable connection to air-conditioning elements can be established to provide the air-conditioning elements with the fluid carrier medium for heat and/or cold and/or fresh air. The hydraulic couplers can each be in flow communication with supply pipes and/or return pipes in the distribution modules.

Heatable and/or coolable furniture (e.g. a couch, a table or a bed) in the room can preferably be connected via the hydraulic couplers. As a result, a user can specifically heat or also cool certain room areas (e.g. a work place, a shower, a couch or a bed). Furthermore, pre-programmable heating scenarios which are dependent on the time of the day can be realized.

The couplers can allow a variable and/or extendible arrangement of the air-conditioning modules on the wall and/or on the ceiling and/or on the floor. The distribution modules can have pipes for the fluid carrier medium, e.g. water pipes. When the carrier medium is suitable for heating and cooling the room, one supply pipe and one return pipe each can be sufficient. However, if a different carrier medium is used for heating and cooling, the distribution module can have respectively separated supply pipes and return pipes.

In addition to the hydraulic couplers, the distribution modules can also have sockets for electric current, which are connected to electric lines in the distribution modules. The sockets can be controlled and/or switched via the control device.

Furthermore, the distribution modules can have fresh air lines and/or exhaust air lines. In addition, power lines can be integrated into the distribution modules. For all lines, the distribution modules can have interfaces (couplers), via which the air-conditioning modules and/or further connectable furniture and/or other devices can be supplied with the fluid carrier medium, fresh air and/or current via corresponding appropriate counter interfaces (couplers). The couplers can be designed e.g. with a bayonet lock or as plug couplers with appropriate (sealed) connecting pieces to allow a fast and safe connection.

In order to control a flow (volume flow or mass flow of the fluid carrier medium or fresh air and/or exhaust air and/or electric current) through the supply pipes and/or return pipes, the distribution modules and or the air-conditioning modules can have valves (or switches, controllers or relays for electric current). In particular, the valves are controlled by the control device.

The valves can be switchable, such that they allow (on-position) or prevent (off-position) a flow, or they can control a flow in a plurality of stages or also in an infinitely variable way. The valves can be e.g. proportional valves. In particular, the valves in the distribution modules can be designed as switchable three-way valves. Each three-way valve can be switched separately. Individual air-conditioning modules or individual pipes or lines in an air-conditioning module can be supplied with a flow via the three-way valves.

In addition to the valves, the distribution modules and/or the air-conditioning modules can have devices for controlling a flow of the fluid carrier medium and/or for controlling a flow of the fresh air through the distribution module. Such a device can be designed e.g. as a rotational speed-controlled circulating pump which can be controlled e.g. via the control device. All air-conditioning modules preferably have separately controllable recirculating pumps in the heating and/or cooling circuits, a supply of the carrier medium via the supply and/or return pipes of the distribution modules being controlled via switchable three-way valves.

The air-conditioning modules and/or the distribution modules can each have separately controllable blower pumps or fans. As a result, a supplied fresh air quantity and/or a removed exhaust air quantity can be controlled. Alternatively, the blower pumps or fans can be designed to provide a circulating air flow which ensures an improved heat exchange between room air and air-conditioning module without effecting an active exchange of the room air.

In addition, the distribution modules and/or the air-conditioning modules can have check valves (or diodes for predetermining a direction of the electric current) to provide the flow of the fluid carrier medium and the air flow with a certain flow direction.

The control device can be designed to separately control the quantity of heat and/or cold and/or fresh air and/or exhaust air for each air-conditioning module. For example, an individually controllable quantity of heat and/or cold and/or fresh air can be set, as desired, for a certain air-conditioning module.

The system according to the invention can be built up and operated room by room and also subsequently and/or parallel to already existing heating systems or air-conditioning systems. Another advantage as compared to conventional concealed wall heating systems is that the system according to the invention can be reconstructed and or rearranged in front of the wall (or under the ceiling and/or above the floor). It is thus possible for the user to adapt the system to a modified room and/or wall use. For this purpose, the air-conditioning modules can be rearranged, removed and/or added without being concealed in the walls and/or in the ceiling and/or in the floor. For this purpose, special fastening means, e.g. in the form of rails, can be mounted on the wall, the air-conditioning modules being attachable in a detachable fashion to the fastening means.

The modular structure of the system with prefabricated air-conditioning modules can simplify the planning, calculation and assembly when such a system is installed, in particular also in the case of a subsequent installation and/or a renovation. In the case of a new construction, in particular with fully prefabricated wall elements, the system can already be installed before the final assembly. As a result, the house manufacturer can achieve a higher manufacturing depth, which also serves to achieve a time- and cost-reduction in the final assembly of the heating system by craftsmen on site.

Furthermore, the system can be designed to provide in a single room at least three climate zones, in each of which a quantity of heat and/or cold and/or fresh air can be provided which is in each case adjusted independently of one another. The three climate zones can be adjusted e.g. in accordance with a height in the room. For example, it is possible to control a foot level, a seating level and a head level independently of one another. Such a division into climate zones according to levels can be advantageous in particular because hot air rises upwards to the ceiling of the room and cold air drops downwards to the floor of the room. A more uniform distribution of the heat can be achieved in a room by adjusting the climate zones. Furthermore, the division into zones can be adapted to given conditions in the room. The areas in the room where people often stay can be preferably provided with heat and/or cold and/or fresh air.

The surface of at least one of the air-conditioning modules preferably has a plurality of scattering centers. The scattering centers serve to scatter light which is emitted by lighting means which can be arranged in an edge area of the surface of the air-conditioning module and illuminate the surface as homogeneously as possible. Alternatively or additionally, the lighting means can also be arranged in the middle of the surface and can emit their light radially outwards and thus illuminate the surface of the air-conditioning module as homogeneously as possible.

In the simplest case, the scattering centers can be produced as surface roughness by a suitable surface treatment. Furthermore, the scattering centers can be designed as microstructures in or on the surface, which cause a diffuse scattering of the light emitted by the lighting means into the room. The scattering centers can be e.g. microprisms, microprism arrays, microlenses and/or microlens arrays. The scattering centers can be arranged on part or on the entire surface of the air-conditioning module. The scattering-centers can be incorporated either directly into the surface, can be adhered as a thin film or can also be vapor-deposited onto the surface. The reflecting microstructure on the surface of the heating surface system can homogeneously scatter light incident on the structure in an angled and bundled fashion and project it into the room.

A direct introduction of the scattering centers into the material of the surface, e.g. by etching methods, electrical discharge machining, laser processing or another suitable surface treatments has the advantage that a thermal conductivity of the surface is not impaired. It is thus possible to utilize the same surface for scattering (visible) light and for transferring heat, also by radiating off thermal radiation. In particular, it is here possible to totally avoid the use of poor heat conductors such as Perspex and/or acrylic glass elements.

The lighting means preferably consist of a plurality of light emitting diodes which can emit red and/or blue and/or green (RGB) and/or white and/or black (UV) light, for example. White light can also be produced by mixing red, blue and green light. When light-emitting diodes in red, blue and green (RGB) are used, any color shades in the entire color spectrum can be obtained by means of color mixing.

The lighting means are preferably sealed in water-tight fashion, and are therefore also suitable for use in wet rooms, such as in a bathroom. The lighting means are advantageously thermally decoupled from the surface by design measures. In particular when the surface is used for heating, the service life of the lighting means can increase because of this. The (infrared) heat radiation of the surface of the air-conditioning modules is not impeded by this design but can be optimized in this way.

The illumination of an air-conditioning module can be designed to optically indicate the respective state of the module. For example, the air-conditioning module can use e.g. red shades to show a heating state and/or blue shades to show a cooling state. An indirect room illumination in almost any selectable colors can also be achieved by an RGB color mixture that can be controlled freely. Air-conditioning modules arranged on the ceiling can also comprise lighting means which emit white light and effect a homogeneous room illumination.

Furthermore, the lighting means can also be actuated in such a way that color gradients can be shown on the surfaces of the air-conditioning modules. The color gradients can also extend over a plurality of air-conditioning modules in a coordinated way. For this purpose, the control device can detect how many air-conditioning modules are mounted in which arrangement on walls, ceiling and/or floor. Alternatively, the arrangement of the air-conditioning modules can be configured. For example, color gradients adapted from nature can be displayed on the walls and/or on the ceiling. In the evening heating operation, e.g. soft red shades which are adapted from a sunset, can be displayed. In the morning, e.g. bright blue and white combinations can be displayed as a light shower. A bright illumination as uniform as possible can be provided in a work area.

Furthermore, a motion-activated, dimmed night lighting can be realized in the foot zone which accompanies the user when he moves through the house and illuminates a path in soft light, e.g. black light.

The lighting means can also have prisms and/or lenses to direct the light emitted by them onto the surface of the air-conditioning modules as homogeneously as possible. For example, the prisms and/or lenses can deflect the light at an angle of less than 20 degrees onto the scattering centers of the surface.

In addition, parabolic reflectors can be arranged behind the lighting means to direct the light onto the surface of the air-conditioning modules. Here, the light can be focused or collimated. Furthermore, Fresnel lenses in front of the lighting means can effect light bundling and a directed projection of the light beams onto the surface of the air-conditioning modules with the scattering centers. The lighting means are preferably connected to the surface by means of a corresponding mechanical design in such a way that the heat generated during the operation of the lighting means is dissipated effectively.

The surface of the air-conditioning modules is preferably made of a material having a heat conduction coefficient of at least 50 W/(m K). For this purpose, a metallic material or a metal alloy can preferably be used as described above. For example, aluminum having a heat conduction coefficient of above 200 W/(m K) is particularly suitable.

BRIEF DESCRIPTION OF THE DRAWINGS

Further advantageous designs are specified below by means of an embodiment illustrated in the drawings. However, the invention is not limited to this embodiment, wherein, by way of diagram.

DETAILED DESCRIPTION OF EMBODIMENTS

In the below description of the preferred embodiments of the present invention, the same reference signs designate the same or comparable components.

Figure 1:
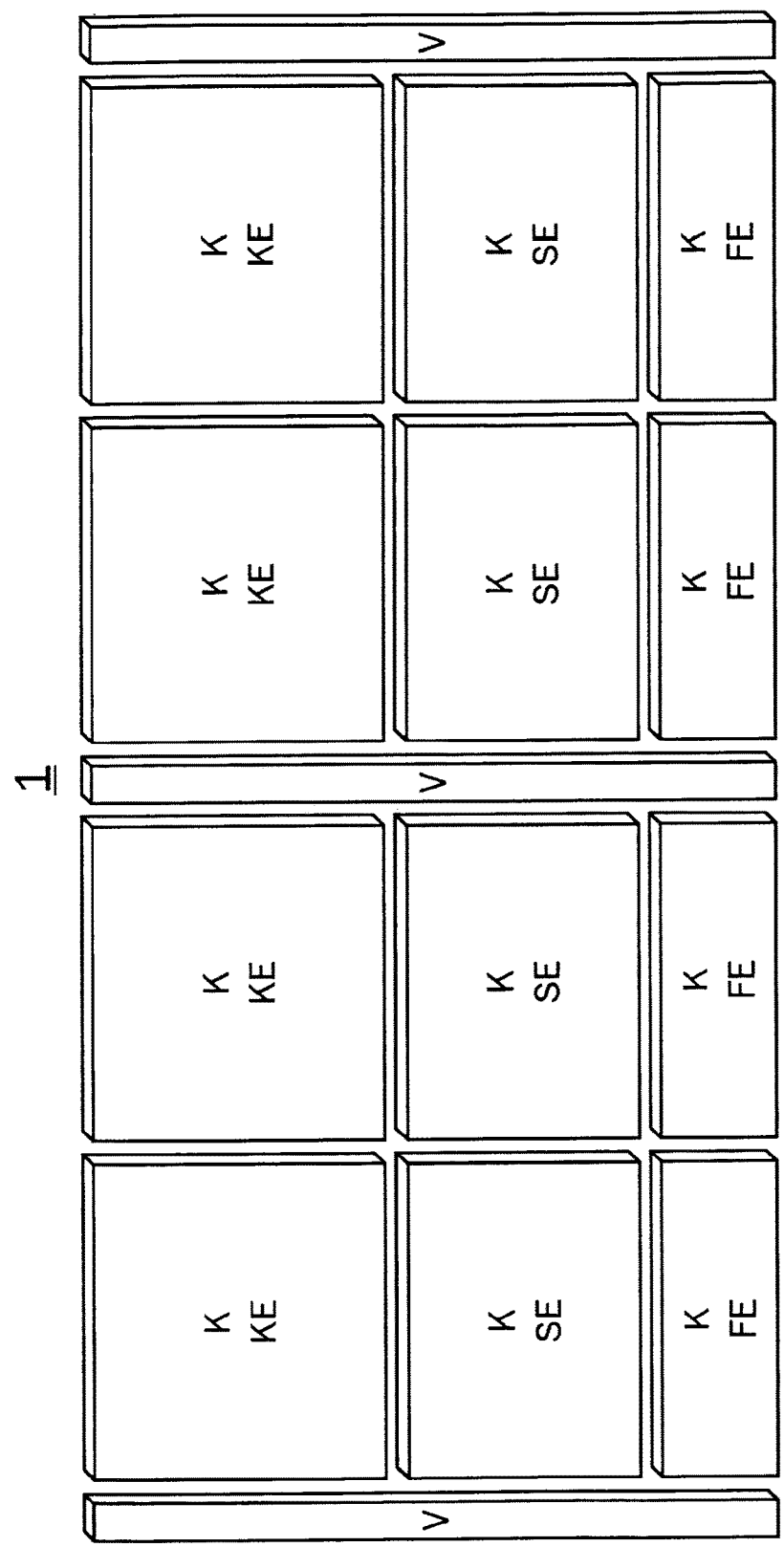
FIG. 1 shows an exploded view of a system for heating and ventilating a room with twelve air-conditioning modules and three distribution modules for arrangement on a wall of the room according to a first embodiment.

FIG. 1 shows a first embodiment of the invention. The system 1 for heating and ventilating a room by means of twelve air-conditioning modules K and three distribution modules V is drawn in an exploded view for better overview. The example shows an arrangement which fully covers a wall of a room. For this purpose, the system 1 has two corner distribution modules V and one central distribution module V. The air-conditioning modules K are divided into three zones: a head level KE, a seating level SE and a foot level FE, which can be regulated independently of one another. In the exploded view, the individual modules are shown in a spaced apart relationship. In an installed state, the modules form a continuous surface.

Further air-conditioning modules K can be connected to the corner distribution modules V at right angles with respect to the illustrated air-conditioning modules K, such that the entire interior wall of a room could be fully lined with air-conditioning modules. As regards rooms which have a non-rectangular floor plan, the distribution modules for the corners of the room can be adapted to the respective conditions such that it is also possible to cover angles of less than 90 degrees or more than 90 degrees.

Figure 2:
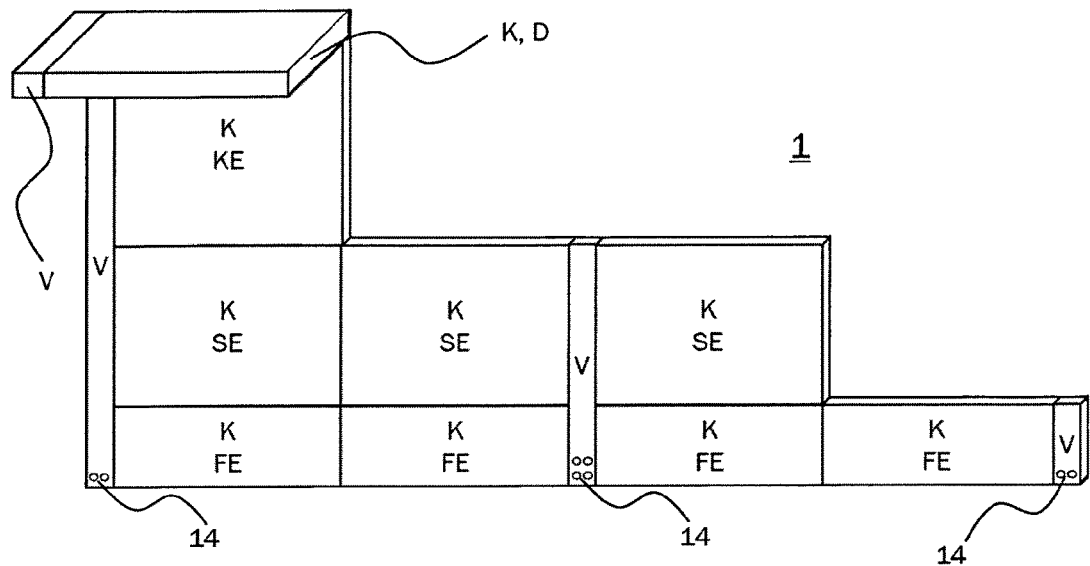
FIG. 2 shows a second embodiment of a system for heating and ventilating a room with eight air-conditioning modules and three distribution modules.
Figure 8:
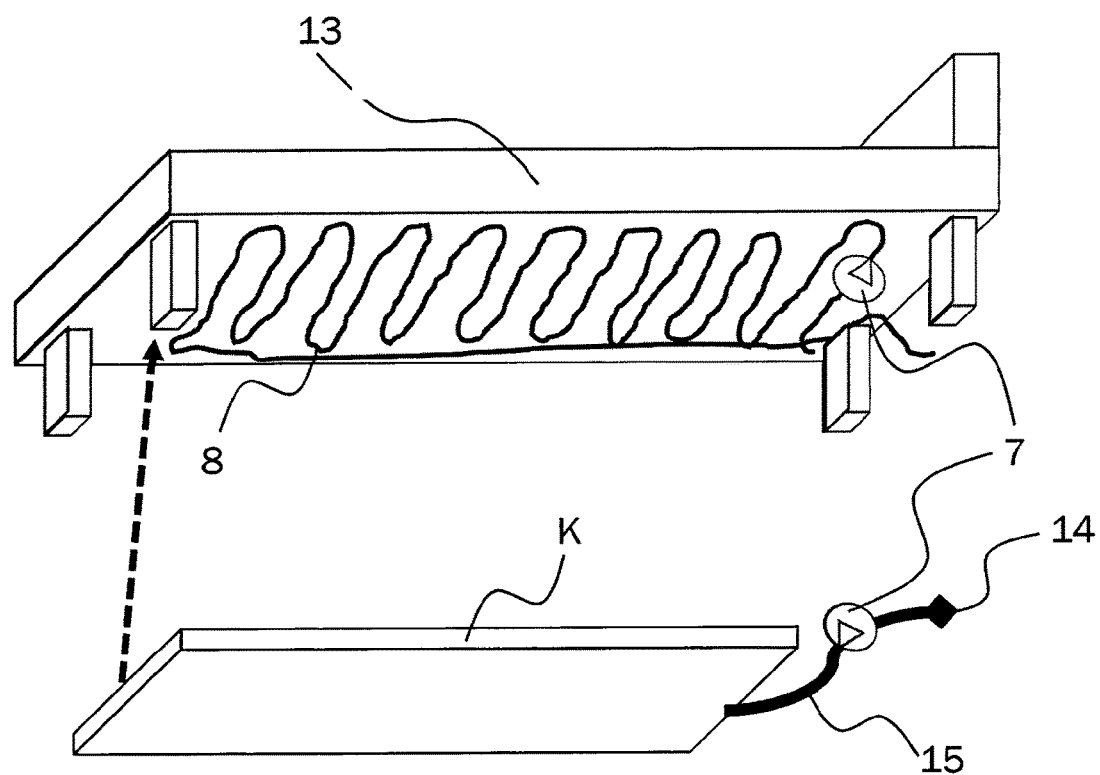
FIG. 8 shows an embodiment of a heatable bed.
Figure 9:
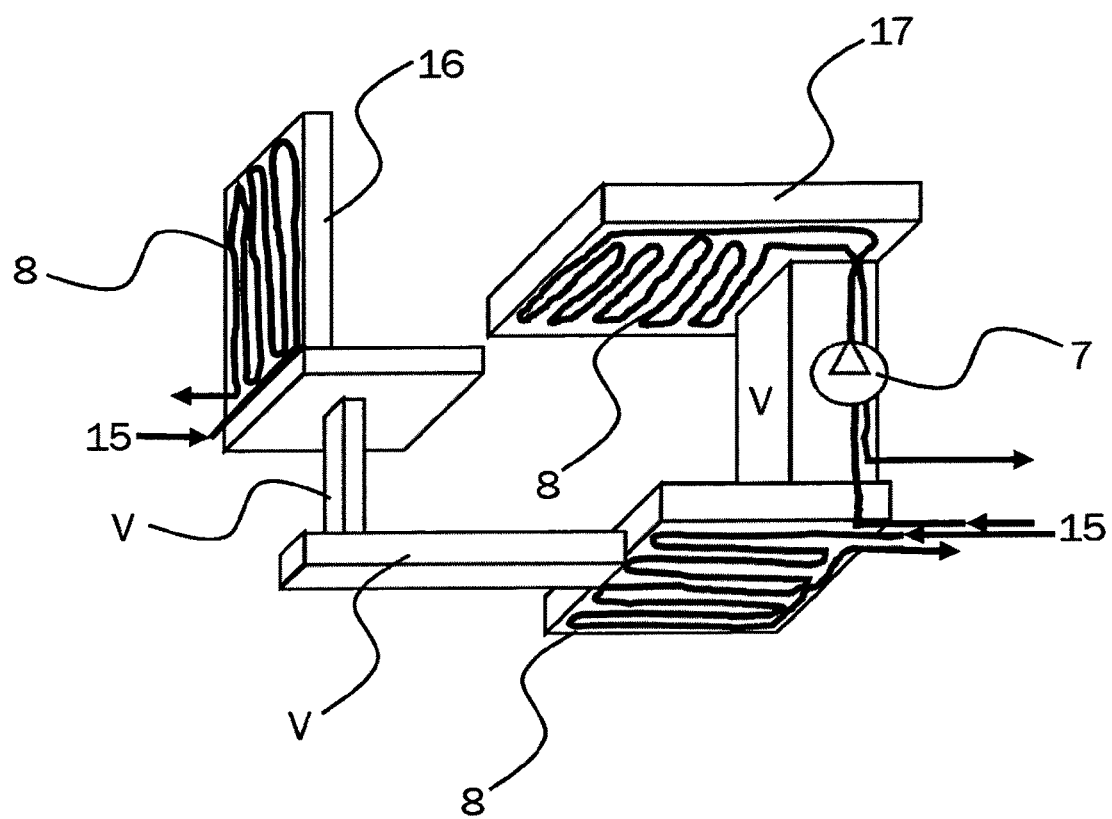
FIG. 9 shows an embodiment of a heatable work place.

FIG. 2 shows a second embodiment of the invention. The system 1 of FIG. 2 is similar to that in FIG. 1 but has a flat arrangement of the air-conditioning modules K on the wall, said arrangement being adapted to special conditions of the particular room. Such an arrangement can be advantageous e.g. in the case of windows or furniture or a television on the wall or when there is a sloping roof. The system 1 according to the second embodiment additionally has an air-conditioning module K, which is arranged on the ceiling D of the room. A distribution module V is arranged along the ceiling D to supply the air-conditioning module K on the ceiling D. Furthermore, the distribution modules V each have a plurality of couplers 14 in an area in the vicinity of the floor. These couplers K can be hydraulic couplers for connecting further air-conditioning modules K which can be arranged in the room, for example. Heatable and/or coolable furniture can also be connected to the couplers. Embodiments of such furniture are shown in FIGS. 8 and 9. At least some of the couplers 14 shown in FIG. 2 can also be electric sockets and/or suitable connections for controlling the system or system components. For this purpose, e.g. USB connections can be provided. Furthermore, other infrastructure connections, such as internet connections, phone connections and/or other interfaces, can also be provided.

Figure 3:
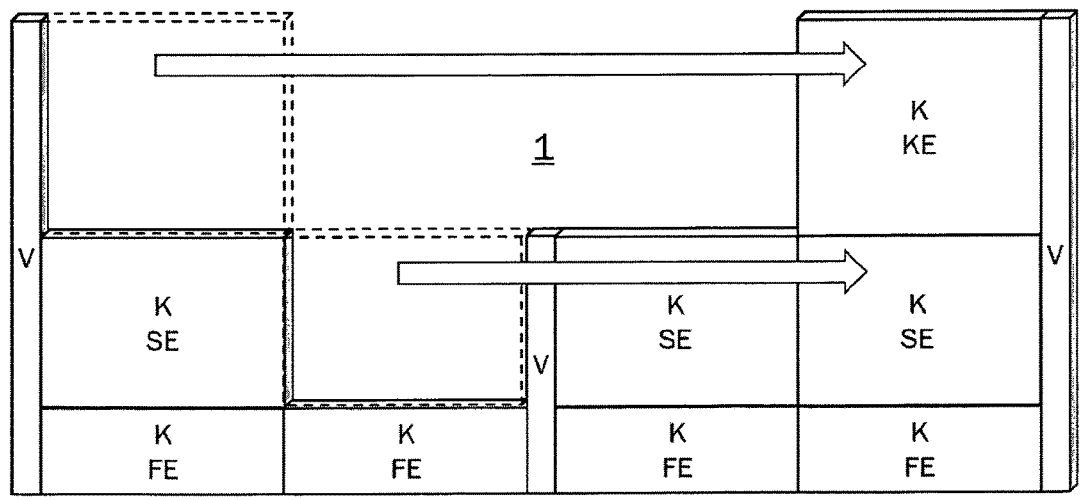
FIG. 3 shows a third embodiment of a system for heating and ventilating a room with eight air-conditioning modules and three distribution modules.

A third embodiment is shown in FIG. 3. FIG. 3 illustrates how a subsequent modification of the arrangement of the air-conditioning modules K can be carried out. Here, two air-conditioning modules K are moved from left to right along the wall and rearranged. This can be advantageous when wall surfaces shall be used differently. In contrast to surface heating systems which are fixedly installed in the wall, a much higher flexibility of the use of space is thus given by the system 1 according to the invention.

Figure 7:
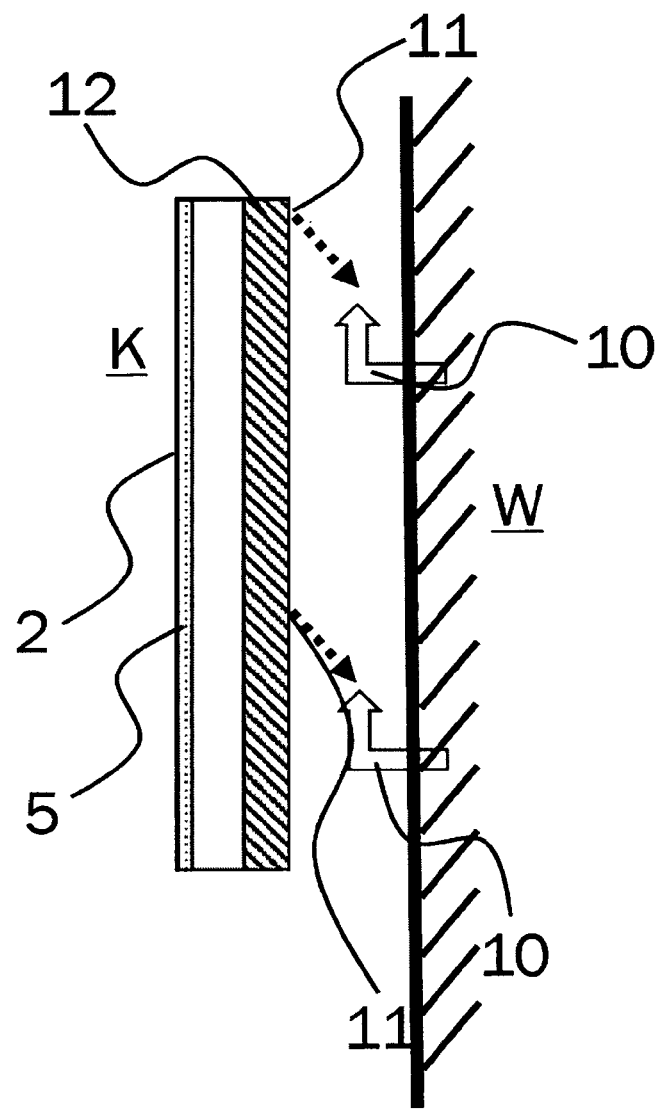
FIG. 7 shows a side view of an air-conditioning module which illustrates an attachment of the air-conditioning module on a wall.

The air-conditioning modules K are attached on the wall W e.g. by means of wall hooks or on rails (see also FIG. 7). The air-conditioning modules are connected to one another and to the distribution modules via detachable couplers, as also used e.g. in a similar way in solar thermal elements. The system 1 receives additional stability by the vertically arranged distribution beams V. The vertical distribution beams are preferably fixedly mounted on the wall W.

Figure 4:
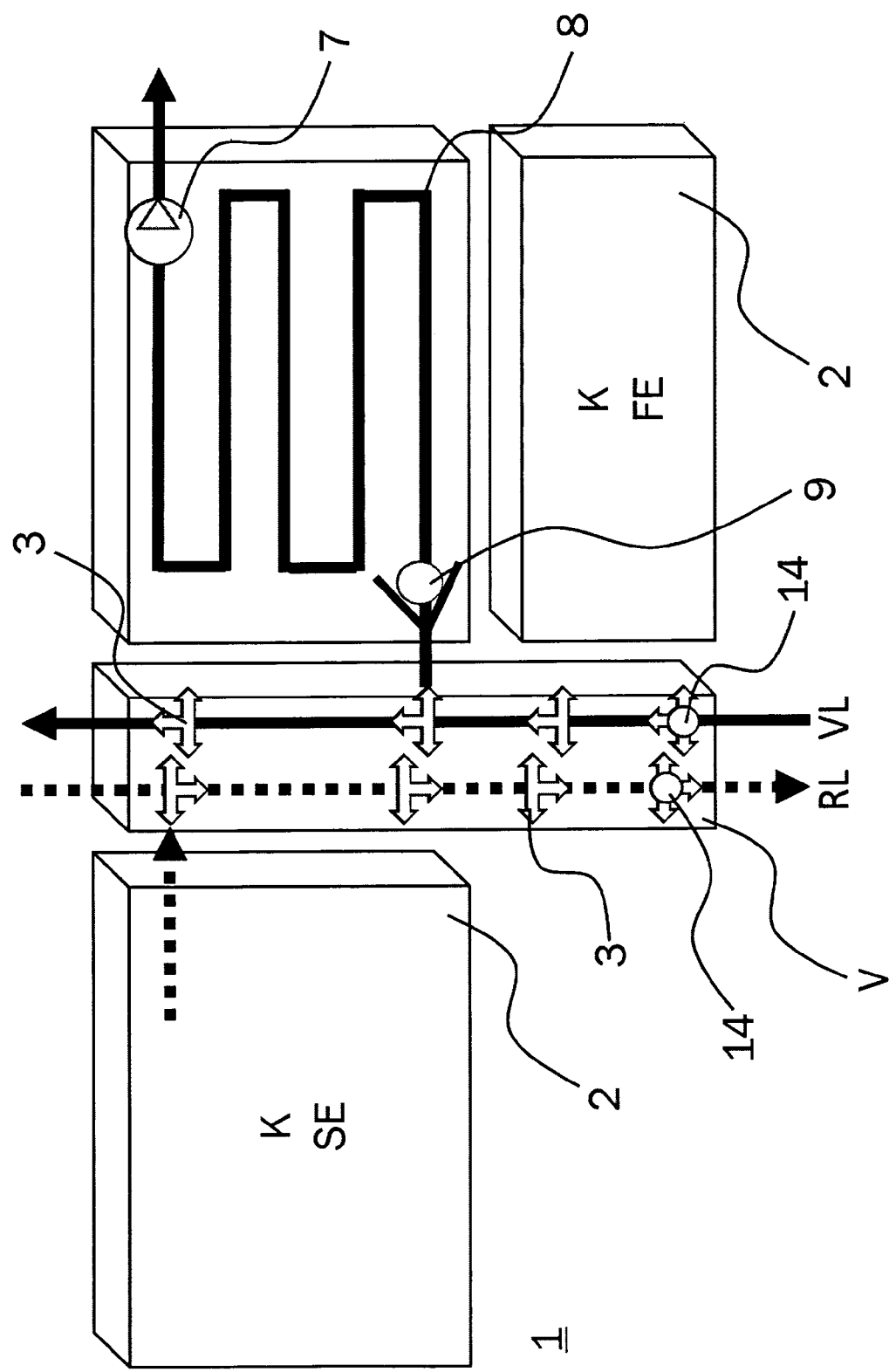
FIG. 4 shows a detailed view which illustrates a heating circuit in a distribution module and in an air-conditioning module.

A section of a system 1 according to a fourth embodiment of the invention is shown in FIG. 4. The modules are drawn at a distance from one another for a clearer presentation. FIG. 4 shows a detailed view of a vertical distribution module V with a supply pipe VL (full line) and a return pipe RL (dashed line) for a fluid carrier medium which transports heat and/or cold. The pipes each have switchable three-way valves 3, by means of which the carrier medium flows into or out of the air-conditioning modules.

Furthermore, three air-conditioning modules K are shown in FIG. 4. A heat supply via the supply pipe VL can be controlled or switched via the three-way valves 3 into the heating circuits of the different air-conditioning modules K. A pipe 8 in a meandering pattern is illustrated by way of example as a heating circuit of an air-conditioning module K in the seating level. After a fluid carrier medium is supplied to the meander 8 via the supply pipe VL, the carrier medium transfers its heat to the surface 2 and flows back to a heating vessel via the return pipe RL. The meander 8 is connected to the surface 2 of the air-conditioning module in thermally conductive fashion. A rotational speed-controllable circulation pump 7 is arranged in the meander 8. A flow of the carrier medium through the air-conditioning module K can be controlled via the rotational speed of the pump 7. For this purpose, the pump 7 receives control signals from a control device. Furthermore, the meander has a check valve 9, which can prevent the carrier medium from flowing in the opposite direction of the predetermined flow direction.

The illustrated meander 8 of the air-conditioning module K can be connected to an adjacent air-conditioning module K (not shown) via suitable hydraulic couplers, such that a plurality of air-conditioning modules K in the seating level SE can be fed by the distribution module V. Alternatively, the meander can be designed in such a way that it is in flow communication with the return pipe RL of the distribution module to directly close the circuit.

Furthermore, additional features, such as loudspeakers, smoke alarms, CO2-sensors, brightness sensors, humidity sensors, heat sensors and/or W-LAN routers can be integrated into the air-conditioning modules K behind or also on the surface 2. In addition, further infrastructures, such as e.g. network cables, can be laid in the distribution elements V. For example, light switches can also be arranged in the distribution elements V.

Figure 5:
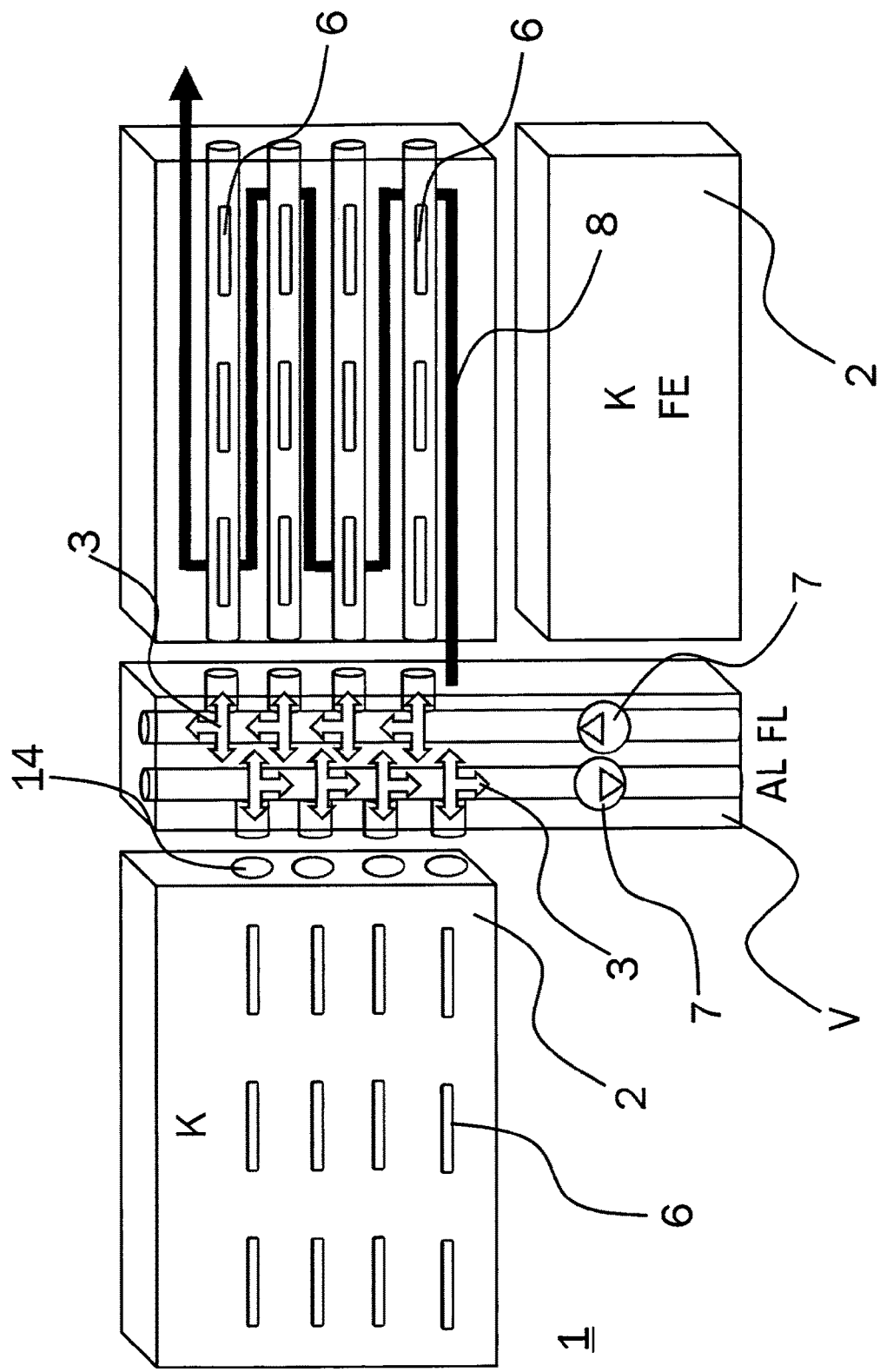
FIG. 5 shows a detailed view which illustrates a ventilation circuit in a distribution module and in air-conditioning modules.

A section of a system 1 according to a fifth embodiment of the invention is shown in FIG. 5. The modules are only drawn at a distance from one another for the purpose of clearer presentation. FIG. 5 shows a distribution module V with a fresh air supply pipe FL and an exhaust pipe AL. The air-conditioning modules K can be supplied with fresh air via the fresh air supply pipe FL. Air, which is sucked in via openings 6 in an air-conditioning module can be discharged by the waste air pipe. The air-conditioning modules K of the embodiment can thus realize an active air exchange of the room air. The fresh air can be released into the room via the openings 6 in the surface 2. An influent flow or effluent flow of air can be switched via three-way valves 3 in the exhaust air pipe AL and the fresh air pipe FL in the distribution module V. Furthermore, fans 7, which effect an air flow, are arranged in each case in the exhaust air pipe AL and the fresh air pipe FL.

The ventilation lines in the air-conditioning module K can be arranged in such a way that the outflowing fresh air is removed along a meander 8 of a heating and/or cooling circuit that extends in the air-conditioning module such that the heat exchange can take place between the carrier medium flowing in the meander 8 and the fresh air. Furthermore, fans can also be arranged in the air-conditioning modules to effect a circulation flow or an air flow of the room air around the heating and/or cooling circuits, such that an improved heat exchange can be effected between the carrier medium and the room air.

Figure 6:
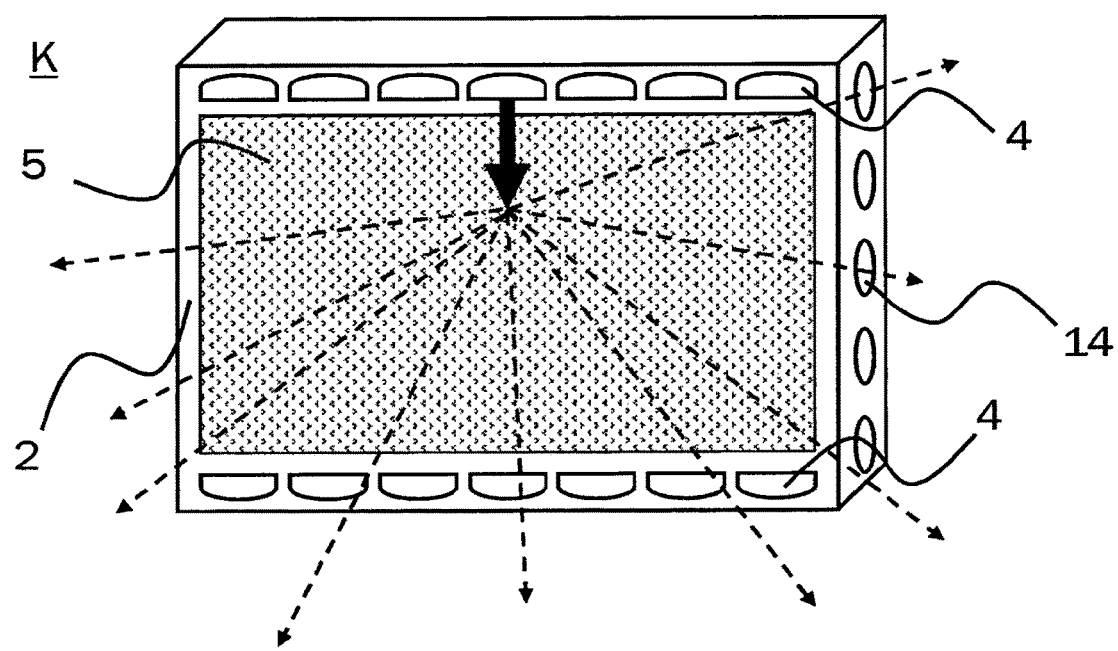
FIG. 6 shows an embodiment of an air-conditioning module with lighting elements and scattering centers for illuminating a room.

FIG. 6 shows an air-conditioning module K which has a plurality of lighting means 4 for illuminating a room, said lighting means being arranged on two edge regions of the surface 2. The surface 2 of the air-conditioning module K has a plurality of scattering centers 5, which are introduced by microstructure methods in the surface 2. The surface is made e.g. from an aluminum sheet which was processed by an etching method to generate the plurality of scattering centers 5.

For example, the thick arrow illustrates a light beam which is emitted by a lighting means 4 and is scattered homogeneously in the room by the plurality of scattering centers 5 (dashed arrows). The lighting means 4 have in each case red, blue, green and white LEDs. The light emitted by the LEDs is directed to the surface 2 of the air-conditioning module K by reflectors. A suitable lens combination in the lighting means 4 ensures a homogeneous illumination of the surface 2. A control electronic, for example, in the control device, controls the plurality of the lighting means 4 to control e.g. a color gradient, color change, brightness and further parameters of the lighting means 4. The lighting means 4 are thermally insulated from the surface 2 of the air-conditioning module. As a result, the service life of the lighting means 4 can be improved.

The air-conditioning module K also has at its side a plurality of couplers 14, via which the heating and/or cooling circuits in the air-conditioning module K can be in flow communication with hydraulic pipes in a supply module.

FIG. 7 shows a side view of an exemplary air-conditioning module K. A plurality of scattering centers 5 for scattering light is arranged on a metallic surface 2 of the air-conditioning module K (see also FIG. 6). A rear side of the air-conditioning module K has a thermal insulation 12. By means of this insulation, the air-conditioning module K can be thermally insulated from the wall W so as to reduce a heat exchange with the wall W and improve a thermal radiation into the room.

Wall hooks 10 are arranged in the wall W and communicate with corresponding fastening lugs 11 in the air-conditioning module K, such that the air-conditioning module K can be detachably attached on the wall W.

The housing of the air-conditioning module K should have the best possible thermal conductivity and the least possible weight. In addition to aluminum or thin steel sheet, composite materials can also be used for this purpose.

FIG. 8 shows an embodiment of a bed 13 which can be heated and/or cooled. The bed has, for this purpose, a heating and/or cooling circuit 8 which has a meandering pattern and is arranged on the lower side of the bed 13. A flow of a fluid carrier medium can be controlled via a rotational speed-controlled pump 7 in the heating and/or cooling circuit 8. Alternatively to the heating and/or cooling circuit 8 arranged on the bed 13, it is also possible to arrange an air-conditioning module K below the bed 13. The air-conditioning module K has a feed line 15 with a rotational speed-controlled pump 7. The feed line 15 can be in flow communication with a coupler 14 in a distribution module via a suitable hydraulic coupler 14.

A further embodiment of furniture that can be heated and/or cooled is shown in FIG. 9. This figure shows a work place with a chair 16 and a table 17. The table 17 and the chair 16 have heating and/or cooling circuits 8, similar to the bed 13 of FIG. 8, which can be provided with the hydraulic carrier medium via suitable feed lines 15.

The individual heating and/or cooling circuits 8 can either be connected to the distribution modules V in each case separately or be connected in series with one another via distribution modules V integrated in the furniture. A pump 7 in the heatable and/or coolable work place 16, 17 controls the flow of the carrier medium.

The features disclosed in the above description, the claims and the drawings can be relevant both separately and in any combination to realize of the invention in the various designs thereof.

LIST OF REFERENCE SIGNS 1 system for heating and/or cooling and/or ventilating and/or illuminating
2 surface
3 three-way valve
4 lighting means
5 scattering centers
6 openings
7 circulation pump and/or rotational speed-controlled fan
8 meander
9 check valve
10 wall hook
11 fastening lug
12 thermal insulation
13 bed
14 (hydraulic) coupler
15 feed line
16 chair
17 table
VL supply pipe
RL return pipe
FL fresh air flow line
AL exhaust air line
K air-conditioning module
FE foot level
SE seating level
KE head level
W wall
D ceiling

The invention claimed is:

1. A system (1) for heating and/or cooling and/or ventilating and/or illuminating a room, comprising:
   a plurality of air-conditioning modules (K) having a flat surface (2), which is designed to discharge heat and/or cold and/or fresh air to the room;
   at least one distribution module (V) configured to provide the plurality of air-conditioning modules (K) with a fluid carrier medium for heat and/or cold and/or fresh air and including a plurality of valves (3) configured to control a flow of the fluid carrier medium and/or control a flow of fresh air; and
   a control device configured to separately control a quantity of heat and/or cold and/or fresh air for each of the plurality of air-conditioning modules (K) by controlling the valves (3) of the at least one distribution module (V);
   wherein the contours of the plurality of air-conditioning modules (K) and the at least one distribution module (V) are designed in such a way that the plurality of air-conditioning modules (K) and the at least one distribution module (V) form, by virtue of their assembly, a substantially flat and continuous surface.

2. The system (1) according to claim 1, wherein the surface (2) of at least one of the plurality of air-conditioning modules (K) has a plurality of openings (6) for discharging fresh air to the room.

3. The system (1) according to claim 1, wherein the air-conditioning modules (K) are designed to be arranged in a detachable manner on the at least one wall (W) and/or ceiling (D) and/or floor of the room so that the arrangement of the air-conditioning modules (K) can be changed.

4. The system (1) according to claim 1, wherein the at least one distribution module (V) has hydraulic couplers (14) by means of which a detachable connection to the air-conditioning modules (K) and/or hydraulic furniture (14, 16, 17) can be established in order to supply the air-conditioning modules (K) with the fluid carrier medium for heat and/or cold and/or fresh air.

5. The system (1) according to claim 1, wherein the system (1) is designed to provide at least three climate zones (FE, SE, KE) in a room, in which a quantity of heat and/or cold and/or fresh air, adjustable independently of one another, is provided.

6. The system (1) according to claim 1, wherein the surface (2) of at least one of the plurality of air-conditioning modules (K) has a plurality of scattering centers (5) for scattering light, wherein the light is emitted by lighting means (4), which are arranged in an edge region of the surface (2) or in the middle of the surface (2).

7. The system (1) according to claim 6, wherein the lighting means (4) are light emitting diodes which emit red and/or blue and/or green and/or white light.

8. The system according to claim 6, wherein the lighting means (4) have prisms and/or lenses to deflect the light emitted by them at an angle of less than 20 degrees in relation to the surface (2) of an air-conditioning module (K) to the scattering centers of the surface (2).

9. The system (1) according to claim 1, wherein the surface (2) of the air-conditioning module (K) consists of a material having a heat conduction coefficient of at least 50 W((m K).

10. The system (1) according to claim 1, wherein the at least one distribution module (V) has at least one device (7) for controlling a flow of the fluid carrier medium and/or for controlling a flow of the fresh air through the distribution module (V).

11. An air-conditioning module (K) for heating and/or cooling and/or ventilating and/or illuminating a room, comprising:
    lighting means (4) for emitting light; and
    a surface (2), which is designed to dissipate heat and or cold and/or fresh air and/or light to a room, defining an edge region and a middle and including a plurality of scattering centers (5) on or in the edge region of the surface (2) and/or on or in the middle of the surface (2) that homogeneously scatter the light emitted by the lighting means (4) in an angled and bundled fashion and project it into the room;

wherein the scattering centers (5) are selected from the group consisting of microprisms, microprism arrays, microlenses and microlens arrays.

12. The air-conditioning module (K) according to claim 11, wherein the air-conditioning module has a device (7) for controlling a flow of the fluid carrier medium and/or for controlling a flow of the fresh air through the air-conditioning module (K).

13. The system (1) according to claim 1, wherein the at least one distribution module (V) comprises a plurality of distribution modules (V) each configured to provide some of the plurality of air-conditioning modules (K) with a fluid carrier medium for heat and/or cold and/or fresh air and each including a plurality of valves (3) configured to control a flow of the fluid carrier medium and/or control a flow of fresh air.

14. The system (1) according to claim 1, wherein the plurality of air-conditioning modules (K) and the at least one distribution module (V) are respectively configured such that the plurality of air-conditioning modules (K) abut the at least one distribution module (V) when in an installed state.

* * * * *